Patented Oct. 28, 1930

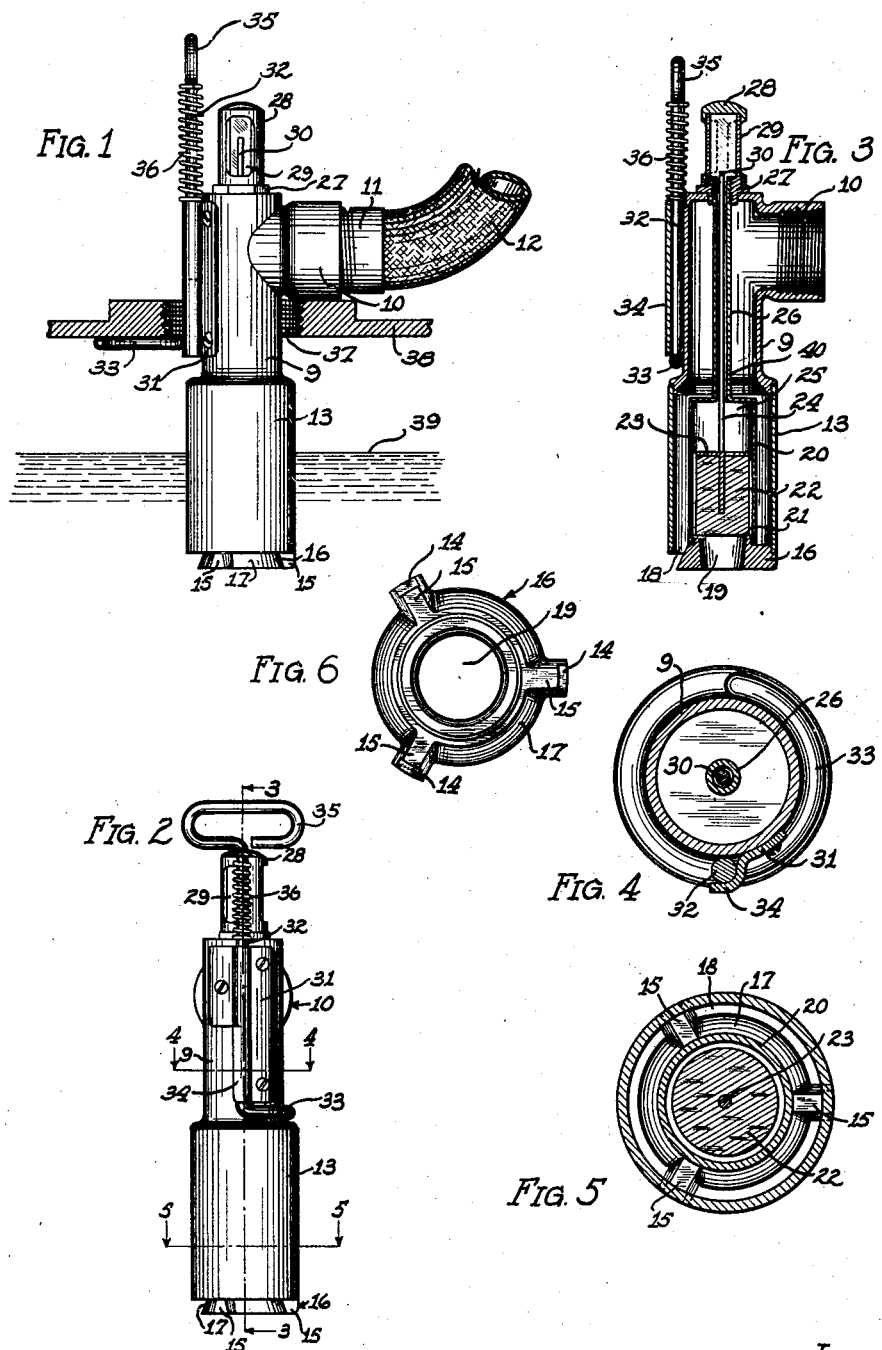

1,779,869

UNITED STATES PATENT OFFICE

ALFRED C. ANDREASEN, OF OAK PARK, ILLINOIS, ASSIGNOR TO AIR-WAY PUMP COMPANY, OF CHICAGO, ILLINOIS, A CORPORATION OF ILLINOIS

HOSE-END INDICATOR

Application filed August 14, 1929. Serial No. 385,949.

This invention relates to a hose end indicator, and more particularly to a device adapted to be secured to the discharge end of a liquid dispensing hose or conduit for insertion through the opening of a vessel to be filled or supplied with a liquid. An object of the invention is the provision of a device of this character adapted to visually indicate the level within the vessel of the liquid being supplied, in order that the operator may discontinue the supply before the vessel overflows. A further object is the provision of a device of the character indicated having means for clamping the inner surface of the vessel for the purpose of maintaining the device properly extended within the interior of the vessel and in a vertical position. An additional object is the provision of a device of this nature durable in construction, inexpensive to manufacture, and positive and accurate in operation.

The device is particularly adapted for use in connection with the hose or discharge conduit of a filling pump or tank in supplying gasoline or other liquid for use in internal combustion engines, especially in cases of tractors, trucks, etc., not equipped with liquid fuel level or capacity indicators, although it is to be understood that the device is not limited to such use or adaptation, but is particularly efficient in indicating a liquid level at the time of approaching the capacity of the vessel by reason of its use and operation in direct contact with the liquid at the filling point.

Other objects will appear hereinafter.

The invention consists in the combinations and arrangements of parts hereinafter described and claimed.

The invention will be best understood by reference to the accompanying drawings forming a part of this specification, in which:

Fig. 1 is an elevational view of the device in operative position, showing a portion of the liquid containing tank in section;

Fig. 2 is an elevational view of the device detached, taken at right angles to Fig. 1;

Fig. 3 is a vertical sectional view taken upon the line 3—3 of Fig. 2;

Fig. 4 is a cross-sectional view taken upon the line 4—4 of Fig. 2;

Fig. 5 is a cross-sectional view taken upon the line 5—5 of Fig. 2; and

Fig. 6 is a plan view of the lower retaining member.

As illustrated in the drawings, the preferred embodiment of the device comprises a central cylindrical supporting member 9 having an internally threaded elbow portion 10 adapted to receive for connection the threaded end 11 of a liquid discharge hose 12, the opposite end of which is connected to a filling pump or tank. The lower extremity of member 9 is preferably flared outwardly and provided with an annular notch for engagement with the upper end of cylindrical member 13, as best shown in Fig. 3, the lower end of which engages notches 14 formed upon radially extending legs 15 of the lower retaining member 16. Member 16 is formed with an inclined lateral surface 17 to provide an annular opening 18, and is also provided with a centrally disposed opening 19. An inner cylindrical member 20 is threaded to member 16, as shown in Fig. 3, the latter provided with an annular shoulder 21 adapted to retain a float 22, preferably composed of cork or other buoyant material. To the upper surface of float 22 is affixed a metallic disc 23 upon which an indicator rod 24 is adapted to rest and be maintained at a level corresponding to the level of the float.

Above the float chamber 25, cylindrical member 20 is reduced to form a tubular indicator rod guide 26, the upper end of which is threaded into plug 27. Threaded on the upper portion of plug 27 is an indicator cage 28 within which is disposed a glass cylinder 29, through which the position of the upper end 30 of rod 24 may be observed. Upper portion 30 is preferably colored red so as to be rendered conspicuous.

Preferably secured to the side of member 9, opposite elbow 10, is a clamp engaging plate 31, the upper portion of which is arranged to provide a vertical cylindrical opening for the slidable engagement of rod 32, the lower end of which has a curved offset arm 33. The lower portion of plate 31 is provided with a flanged portion, and disposed between handle 35 and the plate 31 is a compression spring 36 surrounding rod 32 and adapted to urge the clamping member and clamping arm 33 upwardly. Upon introduction through the filling opening 37 of a liquid receiving tank 38, arm 33 is swung to the position shown in Fig. 4 and maintained by the lower extremity of flange 34. After introduction of the device through opening 37, arm 33 is swung outwardly by means of handle 35 whereby it engages the inner surface of the tank and clamps the device in position, as shown in Fig. 1. It will be noted from Fig. 4 that flange 34 prevents the swinging of arm 33 to the position shown in Fig. 2 until arm 33 is lowered to a point below flange 34.

As liquid passes through discharge conduit 12 it is carried through the passageway formed between tubular member 26 and member 9 and the cylindrical portions 13 and 20, and through the outlet discharge orifice 18, the inclined sides of member 16 forcing the liquid outwardly so that the proper liquid level will act upon float 22. As the upper level of the liquid 39 approaches the capacity level it acts upon float 22, causing the elevation thereof and the consequent elevation of indicator rod 24, the upper extremity 30 being visible through glass 29.

In certain types of force pumps, a reverse suction is developed when operation of the pump is discontinued, and for use in connection with this particular type of pump a small opening 40 is provided in tube 26 to prevent a back-siphon of liquid through hose 12 when the pumping is discontinued, inasmuch as air will enter through spaces between glass 29 and the cage 28 and be drawn downwardly through tube 26 through the opening 40.

The operation of the device will be evident from the foregoing description. The particular construction and arrangement of the discharge passageway and the float chamber opening 19 is such that the force of the liquid does not interfere with proper registration of the liquid level and operation of the float. In the position shown in Fig. 3 the float is at its lowermost position, and as shown in Fig. 1, the float has been elevated through action of the liquid 39, causing the indicating portion 30 of rod 24 to be elevated and designate accurately the upper level of the liquid, whereupon the supply is discontinued.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A hose end indicator adapted to be secured to the discharge end of a liquid dispensing conduit, comprising a casing provided with a liquid passageway, a portion of said indicator adapted to extend interiorly of a liquid receiving vessel, means operable by the liquid within said vessel for visually indicating the upper level of said liquid, and means for clamping said indicator to said vessel.

2. A hose end indicator adapted to be secured to the discharge end of a liquid dispensing conduit, comprising a casing provided with a liquid passageway, a float chamber disposed within said casing, a float in said chamber, and a rod adapted to rest upon and operable by said float for visually indicating the relative elevation of said float.

3. A hose end indicator adapted to be secured to the discharge end of a liquid dispensing conduit, comprising a casing provided with a liquid passageway, a float chamber disposed within said casing, a float in said chamber, means operable by said float for visually indicating the relative elevation of said float, and means for clamping said indicator to a vessel being supplied with liquid.

4. A liquid level indicator adapted to be secured to the discharge end of a liquid dispensing conduit, a portion of said indicator adapted to extend interiorly of a liquid receiving vessel and a portion adapted to extend exteriorly thereof, said indicator provided with a liquid passageway, a float provided in said interiorly extending portion, means in said exteriorly extending portion operable by said float for indicating the liquid level in said vessel, and means for clamping said indicator to said vessel during a filling operation.

5. A liquid level indicator adapted to be secured to the discharge end of a liquid dispensing conduit, a portion of said indicator adapted to extend interiorly of a liquid receiving vessel and a portion adapted to extend exteriorly thereof, said indicator provided with a liquid passageway, a float provided in said interiorly extending portion, means in said exteriorly extending portion operable by said float for indicating the liquid level in said vessel, means for clamping said indicator to said vessel during a filling operation, and air inlet means in said exteriorly extending portion.

In testimony whereof I have signed my name to this specification.

ALFRED C. ANDREASEN.